(12) United States Patent
Hao et al.

(10) Patent No.: US 9,679,591 B1
(45) Date of Patent: Jun. 13, 2017

(54) MAGNETIC SCISSOR SENSOR WITH CLOSED-LOOP SIDE SHIELD

(71) Applicant: HGST Netherlands B.V., Amsterdam (NL)

(72) Inventors: Wenqin Hao, Shenzhen (CN); Quang Le, San Jose, CA (US); Xiaoyong Liu, San Jose, CA (US); Suping Song, Fremont, CA (US); Lei Wang, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/955,878

(22) Filed: Dec. 1, 2015

(51) Int. Cl.
*G11B 5/39* (2006.01)

(52) U.S. Cl.
CPC ............ *G11B 5/3912* (2013.01); *G11B 5/397* (2013.01); *G11B 5/3935* (2013.01); *G11B 5/3954* (2013.01); *G11B 5/3958* (2013.01); *G11B 5/3974* (2013.01); *G11B 5/3977* (2013.01); *G11B 5/3987* (2013.01); *G11B 5/3932* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 8,390,963 B2 | 3/2013 | Dimitrov et al. | |
| 8,582,247 B2 | 11/2013 | Song et al. | |
| 8,724,265 B2 | 5/2014 | Qiu et al. | |
| 8,749,926 B1 | 6/2014 | Le et al. | |
| 8,842,396 B1 | 9/2014 | Zhu | |
| 8,891,207 B1* | 11/2014 | Li et al. | G11B 5/397 360/319 |
| 8,908,333 B1* | 12/2014 | Rudy et al. | G11B 5/3912 360/319 |
| 8,988,812 B1* | 3/2015 | Brunnett et al. | G11B 5/3964 360/55 |
| 9,042,058 B1* | 5/2015 | Li et al. | G11B 5/3912 360/316 |
| 9,087,527 B1* | 7/2015 | Li et al. | G11B 5/3912 |
| 2006/0067005 A1* | 3/2006 | Jayasekara | G11B 5/332 360/319 |
| 2010/0142100 A1 | 6/2010 | Yoshida et al. | |

(Continued)

OTHER PUBLICATIONS

Zhu, J.G., "New Heights for hard disk drives," Materials Today, Jul./Aug. 2003, pp. 22-31.

*Primary Examiner* — Craig A. Renner
(74) *Attorney, Agent, or Firm* — Zilka-Kotab, P.C.

(57) ABSTRACT

A scissor type magnetic sensor for magnetic data recording having a flux closure magnetic side shield structure. The magnetic sensor has a magnetic side shield structure that includes a non-magnetic layer within a magnetic material layer, with the non-magnetic layer being removed from the sensor stack so as to define upper and lower magnetic portions of the magnetic structure that are separated from one another at a region away from the sensor stack. The upper and lower magnetic portions are connected with one another in a region near the sensor stack so as to magnetic flux closure structure. The novel magnetic side shield structure provides net neutral magnetization that does not provide an inadvertent biasing to the magnetic free layers of the magnetic sensor.

20 Claims, 17 Drawing Sheets

(56) References Cited

U.S. PATENT DOCUMENTS

| | | | |
|---|---|---|---|
| 2011/0026169 A1 | 2/2011 | Gill et al. | |
| 2011/0051291 A1* | 3/2011 | Miyauchi et al. ... | G11B 5/3912 360/319 |
| 2014/0153137 A1* | 6/2014 | McKinlay et al. .. | G11B 5/3912 360/235.4 |
| 2014/0268422 A1* | 9/2014 | McKinlay et al. .. | G11B 5/3912 360/128 |
| 2014/0376130 A1* | 12/2014 | Takeo et al. ......... | G11B 5/3912 360/125.17 |
| 2015/0332713 A1* | 11/2015 | Du et al. .............. | G11B 5/3912 360/319 |

\* cited by examiner

MAGNETIC SCISSOR SENSOR WITH CLOSED-LOOP SIDE SHIELD

FIELD OF THE INVENTION

The present invention relates to magnetic data recording and more particularly to a scissor type magnetic sensor with a magnetic side shield having a magnetic flux closure structure.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then, travels through a magnetically soft under-layer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

In the push for ever increasing data density, researchers have searched for ways to decrease gap spacing and also to minimize adjacent track interference of magnetic sensors. Structures such as pinning structures can increase the gap spacing (space between upper and lower magnetic shields) which increases bit length that the read sensor can read. In addition, at tight track pitches, adjacent tracks can alter the magnetization of magnetic free layers resulting in unacceptable signal noise. Therefore, there remains a need for a structure for maximizing data bit density and minimizing adjacent track interference in a magnetic data recording system.

SUMMARY

The present invention provides a magnetic sensor that includes a sensor stack having first and second magnetic free layers separated from one another by a non-magnetic layer. The magnetic sensor also includes a magnetic side shield structure that includes a magnetic structure having upper and lower portions that are separated from one another by a non-magnetic layer in a region recessed from the sensor stack. The non-magnetic layer is removed from the sensor stack so that the upper and lower magnetic portions are magnetically connected with one another in a region near the sensor stack.

The novel side shield structure results in a net-zero magnetization in longitudinal direction that will not inadvertently provide a magnetic biasing to the magnetic free layers of the sensor stack. This side shield structure is particularly advantageous in a scissor type magnetic sensor where an inadvertent side bias will result in shift of the magnetizations of the magnetic free layers from optimal biasing states.

The novel side shield structure can be used in a scissor type magnetic sensor having an in-stack magnetic bias structure for magnetically biasing the magnetizations of the magnetic free layers. In addition, the novel magnetic side shield structure can provide significant advantage in a two-dimensional magnetic recording (TDMR) system, wherein a magnetic head is formed with multiple magnetic sensors for increased data density.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
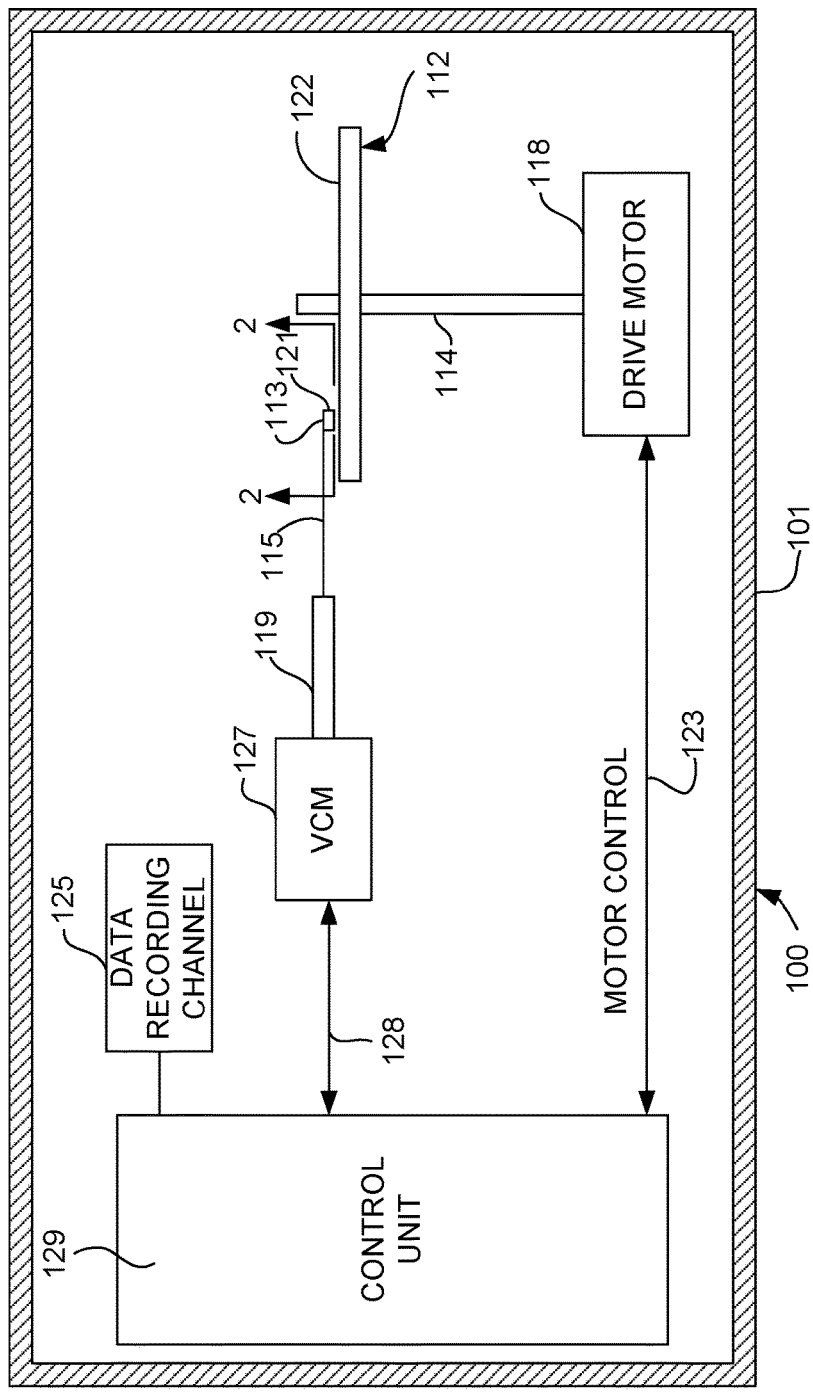
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
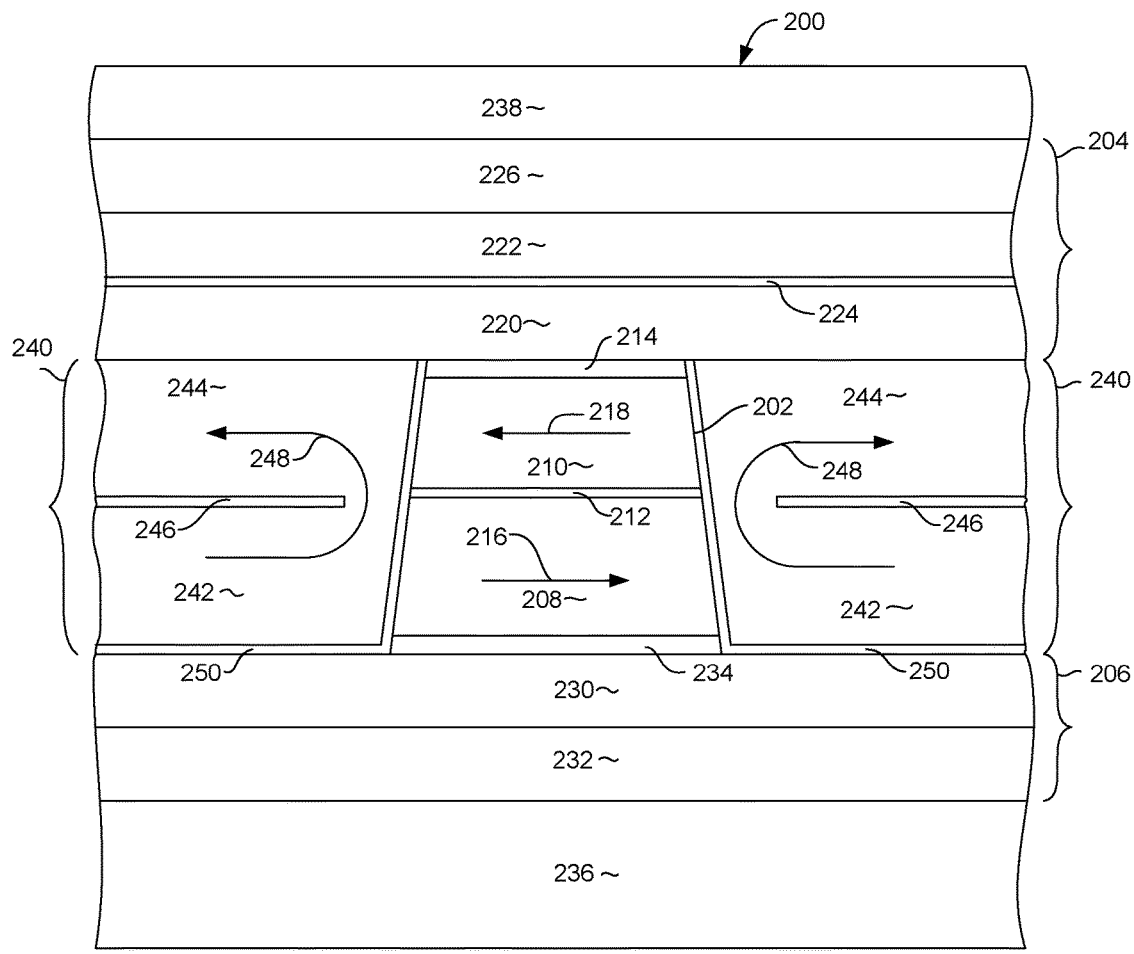
FIG. 2 is a view of a scissor type magnetic sensor as seen from a media facing surface.

FIG. 2 shows a scissor type magnetic sensor 200 according to one possible embodiment as viewed from the media facing surface. The sensor 200 includes a sensor stack 202 that is sandwiched between upper and lower magnetic shield structures 204, 206. The magnetic shield structures 204, 206 provide magnetic shielding, but may also function as in stack biasing structures as will be seen.

Figure 5:
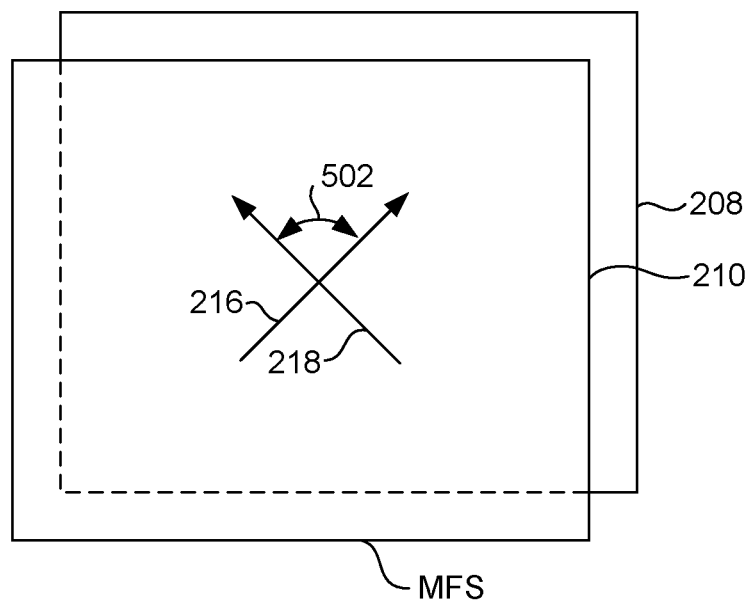
FIG. 5 is an exploded, schematic view showing orientations of magnetizations of a scissor type magnetic sensor.

The sensor stack 202 includes first and second magnetic free layers 208, 210 that are anti-parallel coupled across a non-magnetic spacer or barrier layer 212 that is sandwiched between the magnetic free layers 208, 210. The magnetic free layers 208, 210 have magnetizations indicated by arrows 216, 218 that can be more easily understood with reference to FIG. 5, which shows an exploded, schematic view of the free layers 208, 210. As can be seen, the magnetizations 216, 218 are oriented generally orthogonal to one another and neither parallel with nor perpendicular to the media facing surface MFS. Because the magnetic free layers 208, 210 are anti-parallel coupled with one another, the magnetizations 216, 218 would tend to orient themselves in opposite directions. However, a magnetic bias field from a magnetic bias structure (to be described in greater detail herein below) moves the magnetizations away from an anti-parallel orientation to the generally orthogonal orientation shown in FIG. 5. While the magnetizations 216, 218 are oriented in this orthogonal state in the absence of an external magnetic field, they move relative to one another in a scissoring fashion in response to an external magnetic field, as indicated by arrow 502. This relative movement of the magnetizations 218, 216 results in a changing electrical resistance that can be detected as a magnetic signal.

With reference again to FIG. 2, the sensor 200 can be located between magnetic bias structures 204, 206 that provide magnetic biasing for the magnetic free layers 208, 210. For example, the upper magnetic bias structure can include first and second magnetic layers 220, 222 that are anti-parallel coupled with one another across an anti-parallel coupling layer 224 located there-between. The upper magnetic layer 222 can be exchange coupled with a layer of anti-ferromagnetic material such as IrMn 226 which pins its magnetization in a first direction. The anti-parallel coupling between the layers 220, 222 pins the magnetization of the lower magnetic layer 220. This pinned magnetization of the magnetic layer 220 provides a magnetic bias field for biasing the magnetization 218 of the free layer 210. The free layer 210 can be separated from the magnetic layer 220 by a thin non-magnetic layer 214 so that layer 220 provides a weak ferromagnetic biasing field to bias the magnetization 218 of the free layer 210. Alternatively, if the layer 214 is a non-magnetic layer with a different thickness, then the magnetic layer 220 can provide a weak antiferromagnetic coupling field that biases the magnetization 218 of the free layer 210 in a direction opposite to the magnetization of the magnetic layer 220.

With continued reference to FIG. 2, the bottom magnetic shield 206 can provide a magnetic biasing for the bottom magnetic free layer 208. The bottom shield 206 can include a magnetic layer 230 that is exchange coupled with a layer of anti-ferromagnetic material 232. Because the free layers 208, 210 must be biased in opposite directions, if the upper shield has an even number of magnetic pinned magnetic layers (e.g. two layers 220, 222), then the bottom shield 206 should have an odd number of such layers (e.g. one layer 230). An optional layer 234 (similar to layer 214) can be provided between the free layer 208 and the layer 230. The sensor stack 202 and upper and lower magnetic bias structures 204, 206 can be located between upper and lower magnetic shield structures 238, 236, which can be formed of a soft magnetic material such as Ni—Fe.

Figure 3:
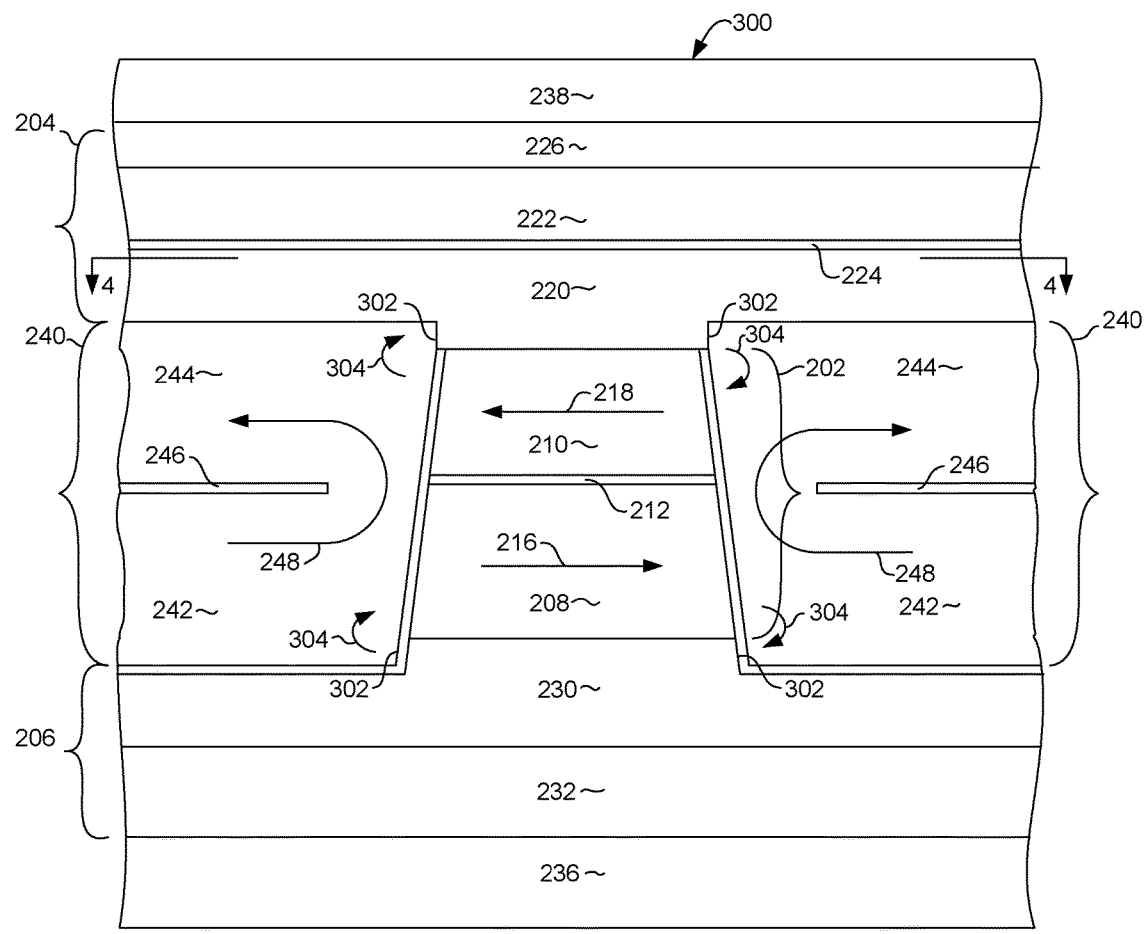
FIG. 3 is a view of a scissor type magnetic sensor according to an alternate embodiment as seen from a media facing surface.

FIG. 3 shows a magnetic sensor 300 having a slightly different in stack bias structure. In FIG. 3, the sensor 300 can be similar to the sensor 200 of FIG. 2, except that the upper and lower shields 204, 206 are formed with notches 302 at the sides of the sensor layers (e.g. free layers 208, 210). These notches result in a de-magnetization field 304 that provides a magnetic bias for the free magnetic layers 208, 210. This de-magnetization field can provide magnetic biasing either with or without a non-magnetic separation/decoupling layer between the free layers 208, 210 and adjacent magnetic bias structures 206, 204.

Figure 4:
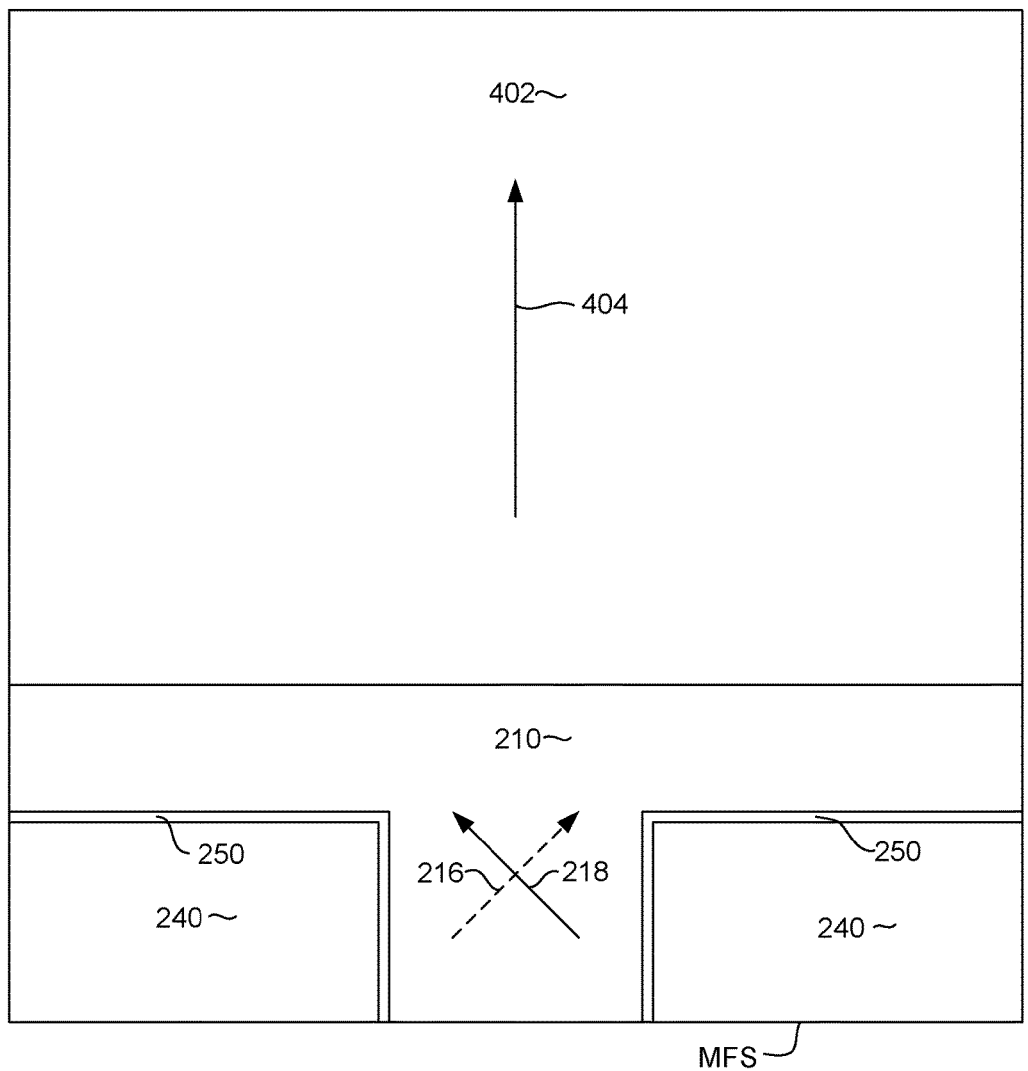
FIG. 4 is a top down, cross sectional view of a magnetic sensor according to an embodiment.

FIG. 4 shows another biasing structure for providing proper magnetic biasing. FIG. 4 shows a top down sectional view as seen from line 4-4 of FIG. 3. FIG. 4 shows a back edge magnetic bias structure 402 having a magnetization 404 that is perpendicular to the media facing surface (MFS). This back edge bias structure 402 is required in addition to the bias structures of either of FIGS. 2 and 3. With reference to FIG. 4, the free layers 210 (208 hidden beneath 210) can be formed so that they become much wider at a location recessed from the media facing surface MFS. While this is optional, it provides increased volumes for the free layers 208, 210, resulting in less magnetic noise. The above described magnetic bias structures are by way of example, however, and other bias structure can be used as well.

With reference again to FIGS. 2 and 3, the sensor 200 (or 300 in FIG. 3) includes a closed loop magnetic side shield structure 240 at either side of the sensor stack 202. Each of the closed loop side shield structures includes a first or bottom magnetic portion 242 and a second or upper magnetic portion 244. A non-magnetic separation layer 246 is located between a portion of the upper and lower magnetic portions 242, 244. However, the non-magnetic separation layer 246 does not extend all of the way to the sensor stack 202. It stops short of the sensor stack 202, so as to allow the upper and lower portions to be physically and magnetically connected with one another in a region near the sensors stack 202. This results in a magnetic flux closure loop, illustrated by arrows 248. It should also be pointed out that, while the flux closure side shield structures 240 are shown in FIGS. 2 and 3, they can also be used with the structure shown in FIG. 4.

The use of the novel flux closure provides significant performance advantages over other structures. Previously, magnetic scissor sensors have used a non-magnetic isolation layer between top and bottom shield which has resulted in large side reading/skirt ratio, resulting in cross track performance degradation and Areal Density Capacity (ADC) loss. In addition, such previously used non-magnetic isolation layers lead to a larger physical-magnetic track-width offset, resulting in the need for a smaller physical track-width and resulting in significant manufacturing challenges. In addition, conventional unidirectional side shield structures such as those used in other types of sensors such as tunnel junction sensors (TMR) and giant magnetoresistive sensors (GMR) cannot be used in a scissor type sensor, because of the need for oppositely oriented free layer magnetizations in scissor type magnetic sensors.

The above described flux closure side shield structure results in a non-biasing magnetic structure, which reduces magnetic side reading thereby enabling increased track pitch. In the structure of FIGS. 2 and 3, the non-magnetic layer 246 (which can be constructed of Ru) can be recessed away from the sides of the sensor stack by a distance of about one to two track widths. The anti-parallel coupling between the upper and lower magnetic portions 242, 244 induces the flux closure so that there is no net magnetic biasing to the free layers 208, 210. If a standard side shield (without the recessed non-magnetic layer 246) were used, a unidirectional magnetic bias would be created which would move the magnetizations of the magnetic free layers 208, 210 away from optimal biasing states. The advantage of the closed loop structure 240 is that side reading control is separated from the magnetic stabilization and biasing of the free layers 208, 210. The use of the flux closure structure 240 can be combined with various magnetic biasing schemes such as those described above with reference to FIGS. 2, 3 and 4.

In effect then, the closed loop side shield structure 240 provides a non-biasing side shield structure. The closed loop side shield structure 240 is preferably magnetically connected with only one of the upper and lower shield structures 204, 206, but not to both. For example, as can be seen in FIGS. 2 and 3, the flux-closure side shield structure 240 contacts the upper shield 204, but is separated from the lower shield by an insulation layer 250, in order to magnetically de-couple the flux-closure side shield 240 from the lower shield 206. In addition to providing this magnetic de-coupling, the layer 250 also prevents the shunting of sense current through the flux-closure side shield structure.

Figure 6:
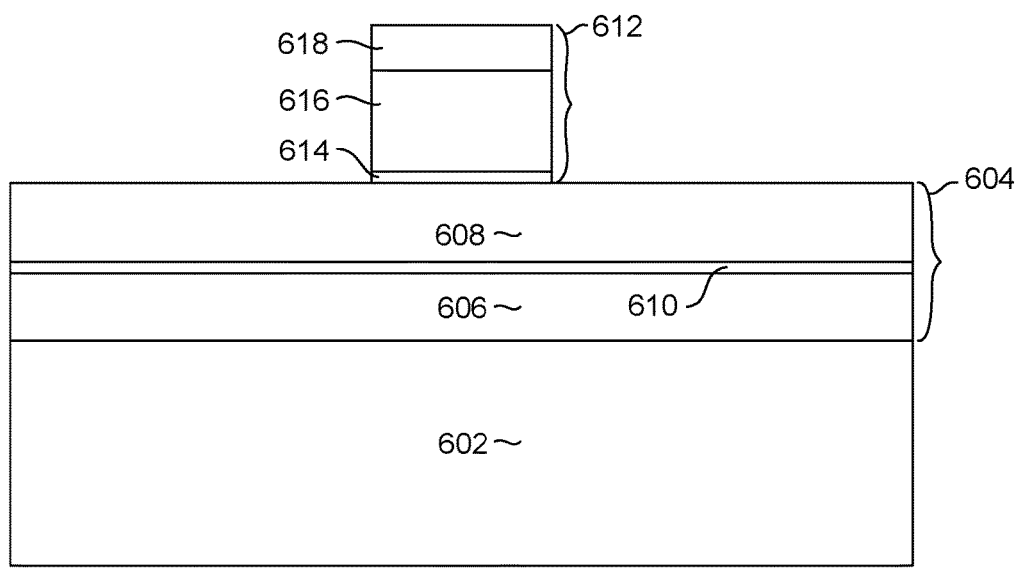
FIGS. 6-15 show a magnetic sensor in various intermediate stages of manufacture, illustrating a method of manufacturing a magnetic sensor.

FIGS. 6-15 show a magnetic sensor in various intermediate stages of manufacture in order to illustrate a possible method for manufacturing a magnetic sensor with a flux-closure side shield structure such as that described above. With particular reference to FIG. 6, a bottom magnetic shield structure 602 is formed and a series of sensor layers 604 is deposited over the shield 602. The series of sensor layers 604 can include first and second magnetic free layers 606, 608 and non-magnetic layer 610 between the magnetic layers 606, 608. A mask structure 612 is formed over the series of sensor layers 604. The mask structure 612 can include a hard mask layer 614, an image transfer layer 616 formed over the hard mask layer 614 and a layer of photolithographically patterned photoresist 618 over the image transfer layer 616. This is, however, by way of example, as the mask 612 may include other layers as well.

Figure 7:
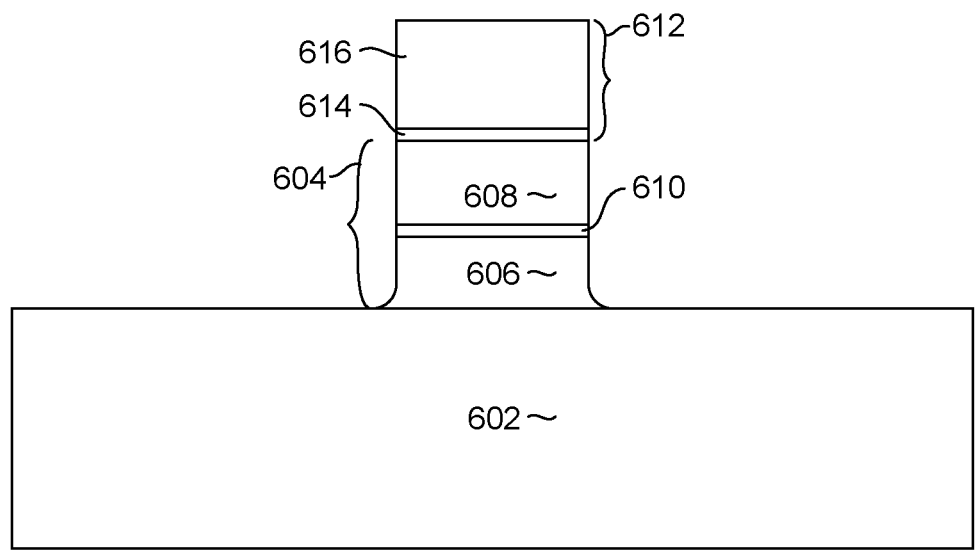
Figure 8:
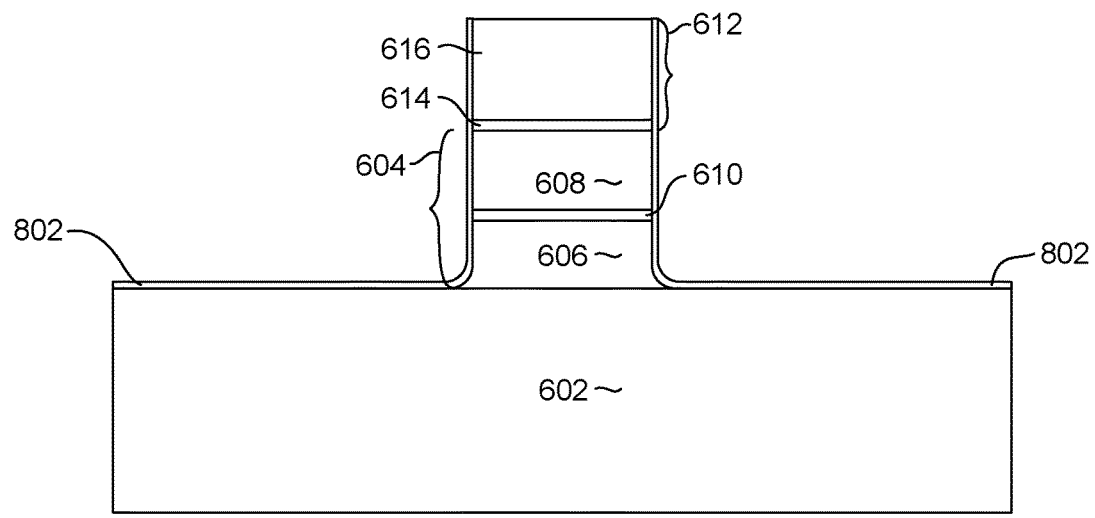

Then, with reference to FIG. 7, an ion milling operation is performed to remove portions of the sensor layers 604 that are not protected by the mask 612, thereby defining a track-width of the sensor layers 604. Then, as shown in FIG. 8 an insulation layer 802 is deposited. The insulation layer can be a material such as alumina or silicon oxide and can be deposited by a conformal deposition method so that it deposits on the sides of the sensor layers 604 as well as over the shield 602.

Figure 9:
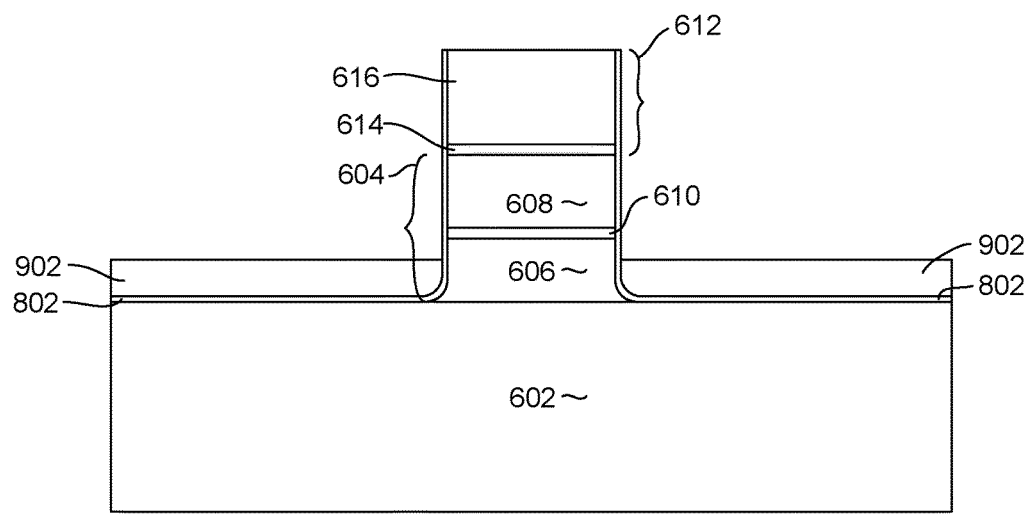

With reference now to FIG. 9, a first magnetic layer 902 is deposited. This layer can be deposited by a deposition process such as ion beam deposition and can be deposited at a vertical angle, such as 90 degrees relative to horizontal so as to deposit the layer 902 primarily on horizontal surfaces.

Figure 10:
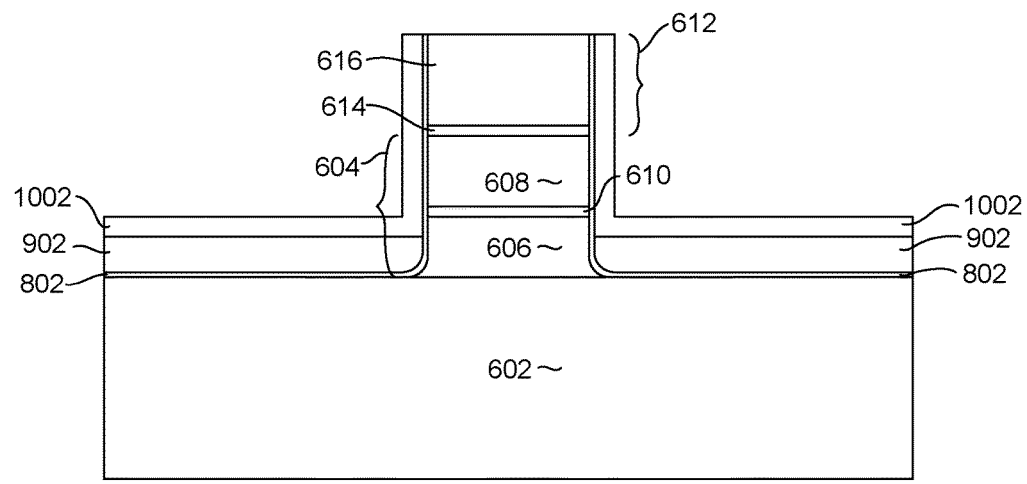

Then, with reference to FIG. 10, a second layer of magnetic material 1002 is deposited. The layer 1002 can also be deposited by ion beam deposition, but this time at an angle so as to deposit on vertical surfaces as well as horizontal surfaces. In other words, the deposition of the second magnetic layer 1002 is performed in a conformal manner.

Figure 11:
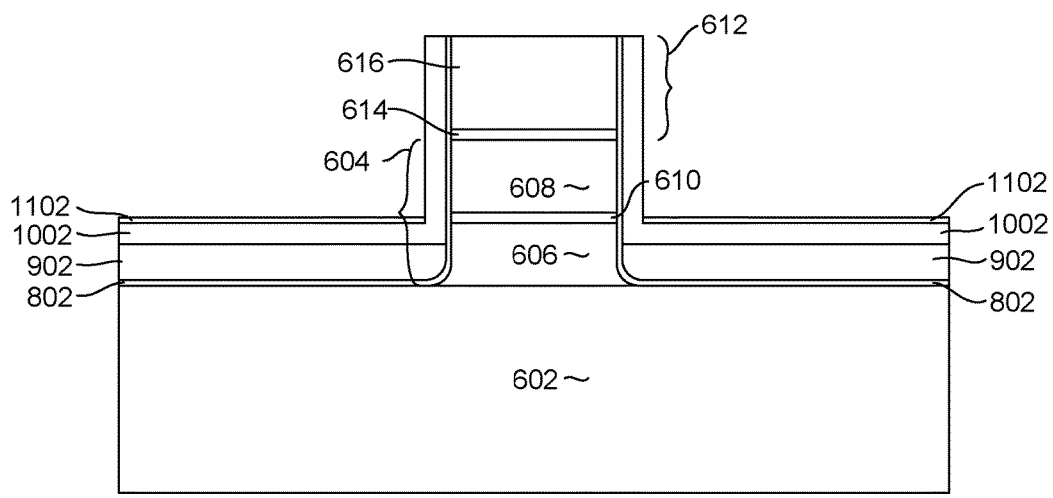

With reference now to FIG. 11, a layer of non-magnetic material 1102 is deposited, this time by a vertical deposition that leaves little or no material 1102 on vertical surfaces. If needed, a quick etching process can be used to remove material 1102 from the vertical sides of the magnetic layer 1002, thereby leaving a structure as shown in FIG. 11. It can be seen in FIG. 11, that the portion of the second magnetic layer 1002 that extends up the sides of the sensor layers 604 acts as a spacer to determine the amount by which the non-magnetic layer 1102 is recessed from the sensor layers 604.

Figure 12:
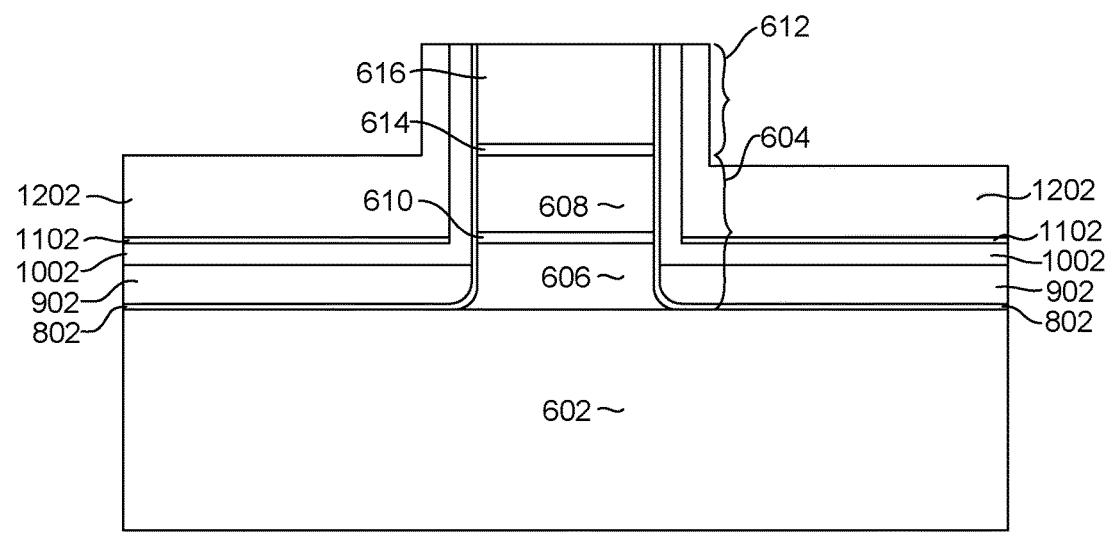
Figure 13:
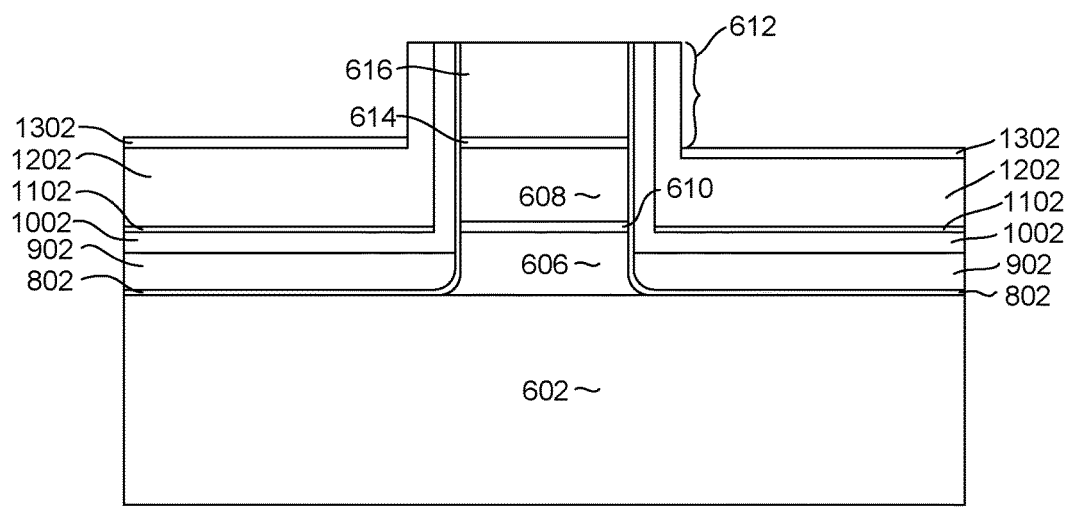

Then, with reference to FIG. 12, a third layer of magnetic material 1202 is deposited over the layer of non-magnetic material 1102. This third magnetic layer 1202 is deposited to a height that is about level with the top of the sensor layers 604. After the third magnetic layer 1202 is deposited, a layer of material that is resistant to chemical mechanical polishing 1302 is deposited, leaving a structure as shown in FIG. 13. This layer 1302 can be referred to as a CMP stop layer and can be a material such as amorphous carbon or diamond like carbon.

Figure 14:
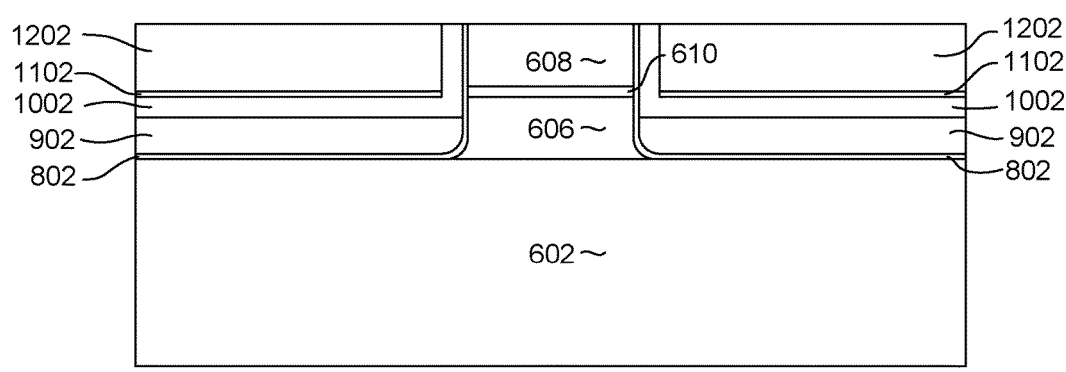
Figure 15:
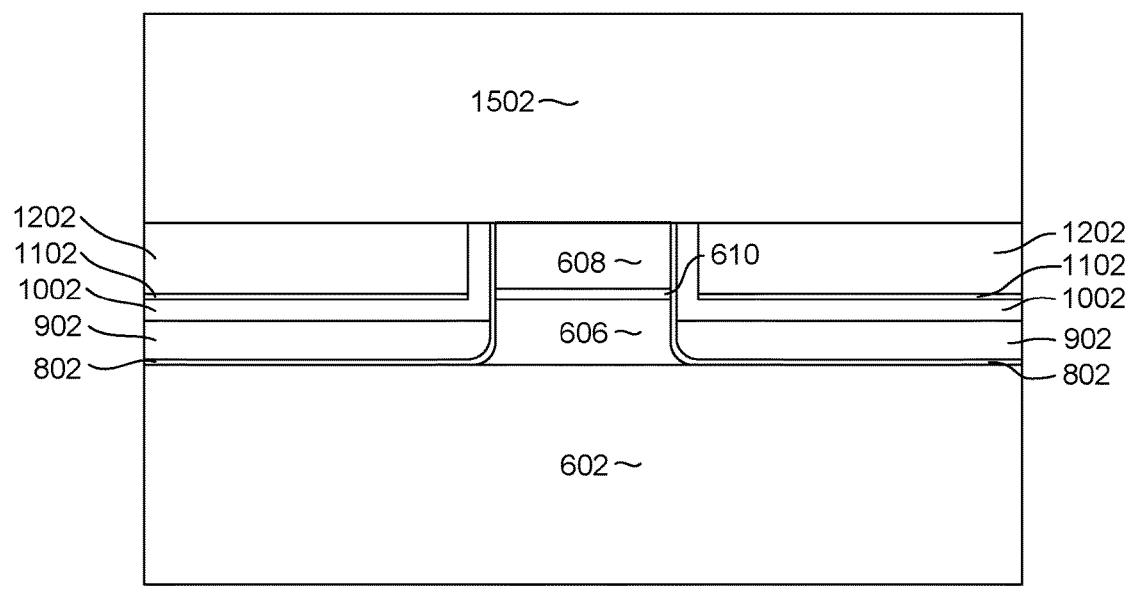

Then, a chemical mechanical polishing (CMP) is performed to remove the remaining mask layer 612 followed by a reactive ion etching to remove the CMP stop layer 1302, leaving a structure as shown in FIG. 14. Then, with reference to FIG. 15, an upper magnetic shield 1502 can be formed over the planar surface formed by the chemical mechanical polishing and reactive ion etching.

While the sensor described above provides performance advantages in a wide variety of magnetic recording systems by reducing adjacent track interference and increasing effective track pitch, it is especially useful in a two-dimensional magnetic recording system. A two dimensional magnetic recording system increases data density by reading and processing signals from multiple magnetic sensors simultaneously.

One example of such a two dimensional magnetic recording head utilizing a flux closure side shield structure is illustrated with reference to FIG. 16 which shows a magnetic recording head 1602 having two (or more) magnetic sensors 1604, 1606 located in-line along the same data track location. As described above, each magnetic sensor 1604, 1606 can be configured as a scissor type magnetic sensor having first and second magnetic free layers 1608, 1610 separated from one another by a non-magnetic spacer or barrier layer 1612. Magnetic biasing for biasing the magnetization of the magnetic free layers 1608, 1610 can be provided by in-stack bias structures 1614, 1616 and 1618, with the bias structure 1616 being located between the magnetic sensors 1604, 1606. Each of the bias structures 1614, 1616, 1618, may be separated from adjacent magnetic free layers 1608, 1610 by a non-magnetic spacer or exchange coupling layer 1620, depending on the type of magnetic biasing being used (e.g. weak exchange coupling or de-magnetization field) such as those mechanisms described above with reference to FIGS. 2, 3 and 4. The magnetic sensors 1604, 1606 and in stack bias structures 1614, 1616, 1618 can be located between upper and lower magnetic shields 1622, 1624, which can be constructed of a magnetically soft material such as Ni—Fe.

The first, or bottom, in-stack bias structure 1614 can include a layer of anti-ferromagnetic material 1626, and a layer of magnetic material 1628 that is exchange coupled with the layer of anti-ferromagnetic material 1626. The exchange coupling between the layer of anti-ferromagnetic material 1626 and the magnetic layer 1628 pins the magnetization of the magnetic layer 1628, and this pinned magnetization provides magnetic biasing to the magnetic free layer 1610 to which it is adjacent, by one of various biasing mechanisms discussed above with reference to FIGS. 2 and 3 such as weak exchange coupling or de-magnetization field coupling.

The second, or middle, in-stack biasing structure 1616 can include a layer of anti-ferromagnetic material 1630 that is located between and exchange coupled with magnetic layers 1632, 1634, which pins the magnetizations of the magnetic layers 1632, 1634 in the same direction as one another. Each of the magnetic layers 1632, 1634 can be anti-parallel coupled with magnetic layers 1636, 1638 across anti-parallel coupling layers 1640, 1642. The magnetic layers 1636, 1638 provide magnetic biasing to their adjacent magnetic free layers 1608, 1610 by biasing mechanisms described above with reference to FIGS. 2 and 3.

Similarly, the third, or upper, in-stack magnetic bias structure 1618, can include a layer of anti-ferromagnetic material 1644 that is exchange coupled with a layer of magnetic material 1646. The magnetic layer 1646 is anti-parallel coupled with a magnetic layer 1648 across an anti-parallel coupling layer 1650 located there-between. The magnetic layer 1648 provides magnetic biasing for the adjacent magnetic free layer 1608. In this case the magnetic bias structure 1616 can provide magnetic biasing to stabilize both the top and bottom sensors 1604, 1606, while reducing the number of anti-ferromagnetic layers needed, thereby reducing the down track separation between the two sensors 1604, 1606.

Figure 16:
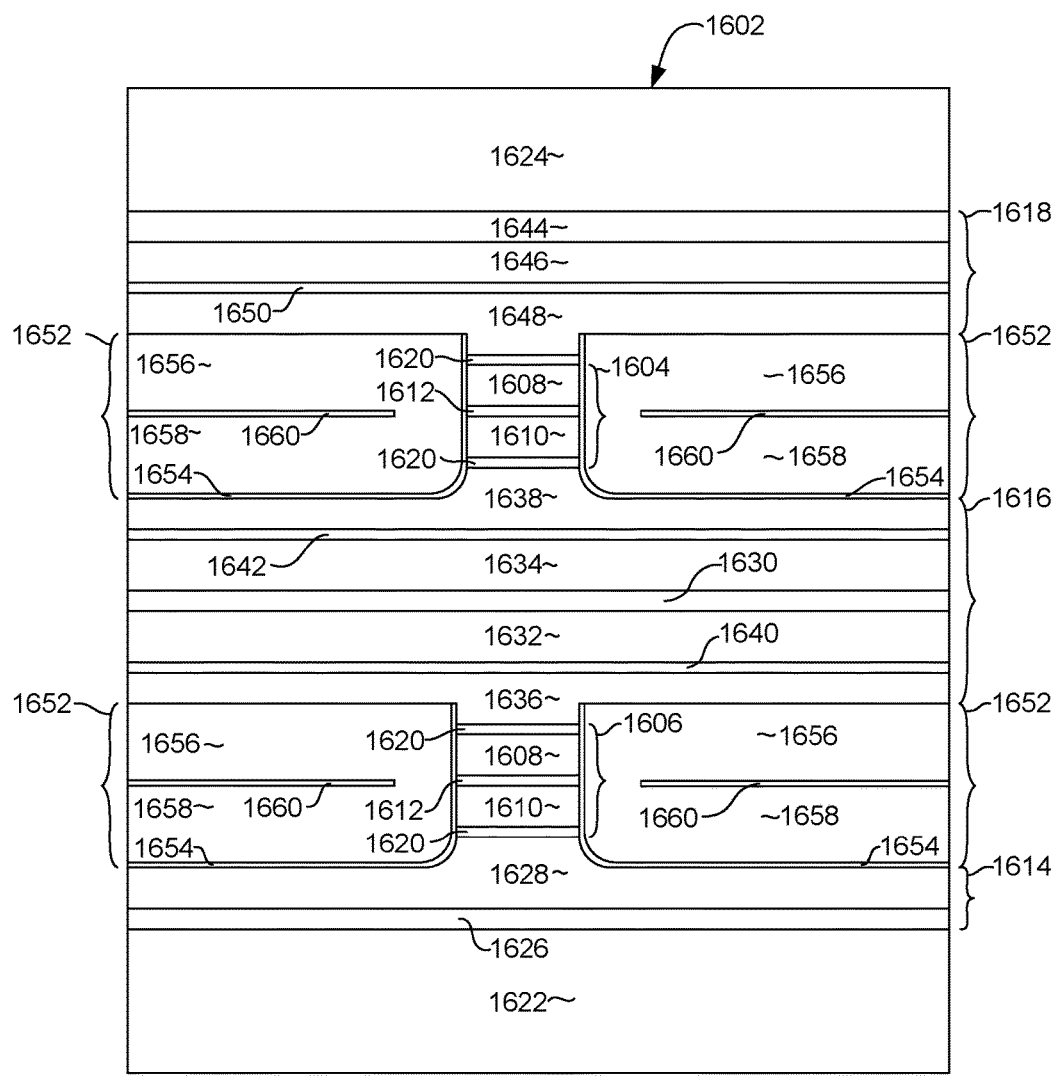
FIG. 16 is a view of a magnetic head having multiple, on track magnetic sensors configured for two-dimensional magnetic recording.

With continued reference to FIG. 16, each of the magnetic sensors 1604, 1606 has flux-closure magnetic side shield structures 1652 that are separated from the adjacent sensor by a thin insulation layer 1654, which can be constructed of a material such as alumina or SiOx. Each of the flux closure side shield structures includes a magnetic material that has an upper portion 1656, a lower portion 1658 and a non-magnetic layer 1660 between an outer portion of the upper and lower magnetic portions 1656, 1658. As described previously with reference to FIGS. 2 and 3, the non-magnetic layer is recessed away from the sensor 1604, 1606 so that the upper and lower portions 1656, 1658 are physically and magnetically connected in a region near the sensors 1604, 1606.

Figure 17:
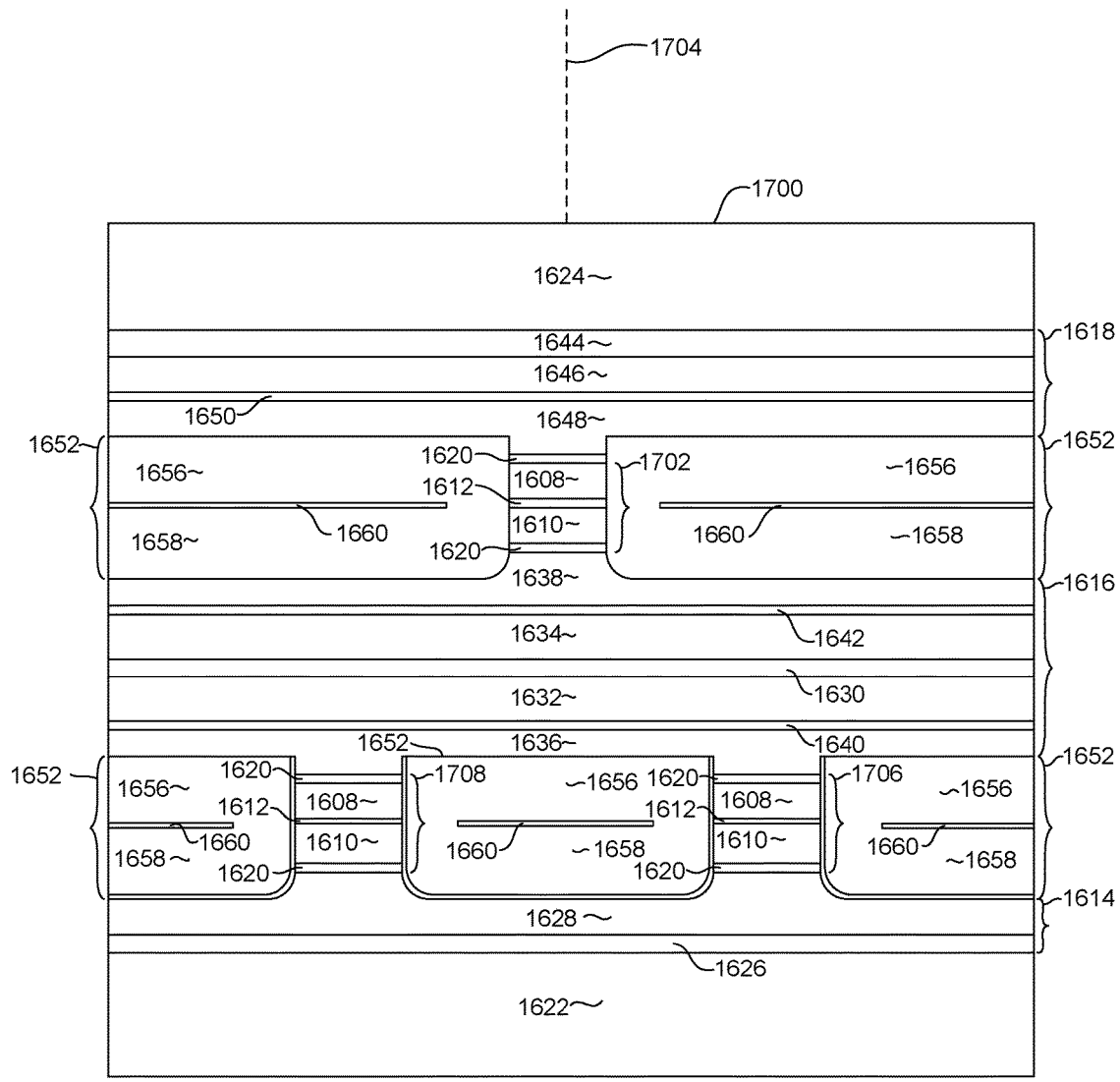
FIG. 17 is a view of a magnetic head having multiple, off track magnetic sensors configured for two-dimensional magnetic recording.

FIG. 17 illustrates a two dimensional data recording system (TDMR) according to another embodiment that also employs flux-closure magnetic side shields. FIG. 17 shows a magnetic head 1700 having a primary magnetic sensor 1702 configured to be located over a data track of interest (represented by dashed line 1704) and first and second secondary magnetic sensors 1706, 1708 that are laterally offset from the data track 1704. As described with reference to FIG. 16, each sensor 1702, 1706, 1708 can include free magnetic layers 1608, 1610 that are separated by a non-magnetic layer 1612 and that have magnetizations that are configured to move in a scissoring fashion relative to one another. The sensors 1702, 1706, 1708 may also optionally include non-magnetic separation layers 1620 at the top and bottom of the sensors. Also as described above, the head 1700 may include in stack bias structures 1614, 1616, 1618, previously described, for providing magnetic biasing for the free layers 1608, 1610 of the sensors 1702, 1706, 1708. The sensors 1702, 1706, 1708 and in stack biasing structures 1614, 1616, 1618 can be located between upper and lower magnetic shields 1622, 1624.

Each of the sensors 1702, 1706, 1708 has magnetic flux-closure side shield structures 1652 as previously described. The secondary magnetic sensors 1706, 1708 may have a shared flux closure side shield 1652 between them.

The use of the secondary magnetic sensors 1706, 1708, which are located at off-track locations help to reduce track pitch and improve signal resolution. Because the secondary sensors 1706, 1708 are located closer to adjacent data tracks than the primary sensor, they pick up more signal from these adjacent tracks. Therefore, this signal from adjacent tracks can be detected and subtracted out from the signal detected by the primary sensor 1702.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:
1. A magnetic sensor, comprising:
a sensor stack having first and second sides, the sensor stack including first and second magnetic free layers; and
a magnetic side shield structure, comprising a magnetic structure having an upper portion and a lower portion and a non-magnetic layer disposed between the upper and lower portions, wherein the non-magnetic layer does not extend to the sensor stack so that the upper and lower portions of the magnetic structure are directly connected with one another.

2. The magnetic sensor as in claim 1, wherein the upper and lower portions are physically connected with one another in a region near the sensor stack.

3. The magnetic sensor as in claim 1, wherein the magnetic side shield structure is separated from the sensor stack by a non-magnetic, insulation layer.

4. The magnetic sensor as in claim 1, wherein the magnetic sensor is configured to read a data track having a track width, and wherein the non-magnetic layer of the magnetic side shield structure is separated from the sensor stack by a distance of one to two times the track width.

5. The magnetic sensor as in claim 1, wherein the non-magnetic layer of the magnetic side shield structure comprises Ru.

6. The magnetic sensor as in claim 1, further comprising an in-stack magnetic bias structure for biasing the magnetization of the magnetic free layers.

7. The magnetic sensor as in claim 1, wherein one of the upper and lower portions of the magnetic side shield structure is magnetically connected with an in-stack magnetic bias structure.

8. The magnetic sensor as in claim 1, wherein the sensor stack is between leading and trailing magnetic shields, and wherein the magnetic structure of the magnetic side shield structure is magnetically coupled with only one of the leading and trailing magnetic shields.

9. The magnetic sensor as in claim 1, wherein the magnetic structure of the magnetic side shield structure comprises Ni—Fe.

10. A two dimensional magnetic recording head, comprising:
a magnetic head having a plurality of magnetic sensors, each magnetic sensor comprising:
a sensor stack having first and second sides, the sensor stack including first and second magnetic free layers; and
a magnetic side shield structure, comprising a magnetic structure having an upper portion and a lower portion and a non-magnetic layer disposed between the upper and lower portions, wherein the non-magnetic layer does not extend to the sensor stack so that the upper and lower portions of the magnetic structure are directly connected with one another.

11. The magnetic head as in claim 10, wherein one of the magnetic sensors is a primary magnetic sensor configured to read a data track, and at least one of the plurality of magnetic sensors is a secondary magnetic sensor.

12. The magnetic head as in claim 11, wherein the secondary magnetic sensor is arranged so as to be aligned over the data track to be read by the primary magnetic sensor.

13. The magnetic head as in claim 11, wherein the secondary sensor is laterally offset from the primary magnetic sensor.

14. The magnetic head as in claim 11, wherein the secondary sensor is arranged so as to be aligned with a data track that is adjacent to the data track to be read by the primary magnetic sensor.

15. The magnetic head as in claim 10, wherein the upper and lower portions are physically connected with one another in a region near the sensor stack.

16. The magnetic head as in claim 10, wherein the magnetic side shield structure is separated from the sensor stack by a non-magnetic, insulation layer.

17. The magnetic head as in claim 10, wherein each of the plurality of magnetic sensors is configured to define a track width and wherein the non-magnetic layer of the magnetic side shield structure is separated from the sensor stack by a distance of one to two times the track width.

18. The magnetic head as in claim 10, wherein each magnetic sensor further comprises an in-stack magnetic bias structure for biasing a magnetization of the first and second magnetic free layers.

19. The magnetic head as in claim 10 wherein each magnetic sensor includes a leading shield and a trailing shield, the sensor stack being between the leading shield and trailing shield and wherein the magnetic side shield structure is magnetically connected with only one of the leading shield and trailing shield.

20. A magnetic data recording system, comprising:
a housing;
a magnetic media mounted within the housing;
an actuator;
a slider connected with the actuator for movement adjacent to a surface of the magnetic media; and
a magnetic sensor formed on the slider, the magnetic sensor further comprising:
a sensor stack having first and second sides, the sensor stack including first and second magnetic free layers; and
a magnetic side shield structure, comprising a magnetic structure having an upper portion and a lower portion and a non-magnetic layer disposed between the upper and lower portions, wherein the non-magnetic layer does not extend to the sensor stack so that the upper and lower portions of the magnetic structure are directly connected with one another.

* * * * *